United States Patent [19]
Hagstrom

[11] Patent Number: 6,142,450
[45] Date of Patent: Nov. 7, 2000

[54] LIGHTNING RESISTANT HYDROLOGICAL PULLEY

[76] Inventor: Gotthard L. Hagstrom, 113 Bass Dr., Interlachen, Fla. 32148

[21] Appl. No.: 09/330,414

[22] Filed: Jun. 11, 1999

[51] Int. Cl.$^7$ ....................................................... B66D 3/04
[52] U.S. Cl. ........................... 254/390; 254/416; 254/902
[58] Field of Search ..................................... 254/389, 390, 254/416, 901, 902

[56] References Cited

U.S. PATENT DOCUMENTS

| 487,491 | 12/1892 | Nock | 254/902 X |
|---|---|---|---|
| 1,132,168 | 3/1915 | Davidson | 254/416 |
| 1,160,364 | 11/1915 | Baekeland | 254/416 X |
| 1,177,046 | 3/1916 | Nice | 254/416 X |
| 2,117,084 | 5/1938 | Elmes | 254/390 |
| 2,806,380 | 9/1957 | Martin | 254/390 |
| 3,830,478 | 8/1974 | Pietroni | 266/3 R |
| 3,872,793 | 3/1975 | Patin | 104/130 |
| 5,154,401 | 10/1992 | Schramm et al. | 254/390 X |
| 5,307,672 | 5/1994 | Macchiarulo et al. | 73/118.1 |

FOREIGN PATENT DOCUMENTS 1231191  5/1971  United Kingdom ................... 254/192

*Primary Examiner*—Donald P. Walsh
*Assistant Examiner*—Emmanuel M. Marcelo
*Attorney, Agent, or Firm*—Paul S. Rooy

[57] ABSTRACT

A lightning resistant hydrological pulley comprising an insulator between a pulley body and an axle insert. The insulator is made of electrically non-conductive material, thereby denying lightning surges an electrical path from the pulley body to an axle disposed within the axle insert. Set screws angularly immobilize the pulley body relative to the insulator, and the insulator relative to the axle insert and relative to an axle disposed within the axle insert. In the preferred embodiment, the insulator is made of synthetic material such as white Delrin, and the pulley body and the axle insert are made of brass.

17 Claims, 4 Drawing Sheets

LIGHTNING RESISTANT HYDROLOGICAL PULLEY

BACKGROUND OF THE INVENTION

1. Field of the Invention

This invention relates to hydrological pulleys used in monitoring wells, and in particular to a lightning resistant hydrological pulley.

2. Background of the Invention

Monitoring wells are used extensively to observe and record subterranean water level. For example, in the state of Florida alone there are thousands of monitoring wells all across the state.

This measurement function is important, because the resultant data may be used to determine the amount of extra irrigation required by crops, to forecast rainfall trends, to help plan what specific types of crops to plant, as well as to aid in designing storm-water handling systems and flood control, etc.

A typical monitoring well 2 is illustrated in FIG. 1. Well shaft 4 extends below ground level 3 to a depth sufficient to reach water 5. Tape 8 depends from hydrological pulley 9, which is free to rotate as indicated by arrow 16. First weight 10 is attached to one extreme of tape 8; float 12 and second weight 14 are attached to an opposite extreme of tape 8.

As the water level 7 goes up and down, so also float 12 ascends and descends, thereby turning hydrological pulley 9 as indicated by arrow 16. Tape 8 is maintained taut over hydrological pulley 9 by means of first weight 10 and second weight 12. In practice, hydrological pulley 9 frequently comprises spikes 28 disposed within tape groove 26, which mate with spike holes 30 in tape 8. See also FIG. 2. Spikes 28 within spike holes 30 prevent tape 8 from slipping on hydrological pulley 9.

Hydrological pulley 9 is attached to encoder disk 20 by means of axle 18. Thus, as hydrological pulley 9 rotates, so also does encoder disk 20. Electronic sensor 22 senses rotation of encoder disk 20, and transmits this information to encoder 24. Encoder 24 collects data including direction and magnitude of rotation of encoder disk 20, which raw data yields a continuous record of the height of water level 7. A paper tape record may also be kept.

Because conventional tape 8 is made of stainless steel, and because conventional hydrological pulleys 9 are made of metal, a major problem associated with conventional monitoring wells 2 is the damage caused by lightning strikes to tape 8 and/or to hydrological pulley 9. Because stainless steel and metal conduct electricity, any lighting strike to tape 8 or hydrological pulley 9 will be conducted through axle 18, encoder disk 20 and electronic sensor 22 to encoder 24. The voltage of lightning strikes runs in the millions of volts, which generally has the effect of destroying the encoder 24 electronics and sensor 22, and may damage encoder disk 20. The replacement cost of these components runs between $400 and $2,000, depending on the specific monitoring configuration of the equipment affected. This lightning-strike monitoring well damage problem is especially pronounced in areas of high thunder storm concentration, such as Florida, Kansas, Texas, Missouri, Louisiana, etc.

Existing Designs

One solution to the lightning strike problem has been the introduction of black Delrin as a material from which to make hydrological pulleys. Unfortunately, black Delrin contains a high carbon content, which conducts electricity. Thus, this proposed solution does not completely insulate encoder disks 20, electronic sensors 22, nor encoders 24 from lightning strike damage.

SUMMARY OF THE INVENTION

Accordingly, it is an object of the present invention to provide a lightning resistant hydrological pulley which insulates its axle from a tape disposed within its tape groove. Design features allowing this object to be accomplished include an insulator disposed within a hydrological pulley boss. Advantages associated with the accomplishment of this object include reduced chance of lightning induced damage to the electronic sensor, encoder disk and to the encoder itself, and associated cost savings in repair and replacement parts.

It is another object of the present invention to provide a lightning resistant hydrological pulley which is interchangeable with conventional hydrological pulleys. Design features allowing this object to be accomplished include a tape groove having spikes and an axle insert having an axle insert bore sized to accommodate a conventional encoder disk axle. Benefits associated with the accomplishment of this object include the ability to retrofit the instant lightning resistant hydrological pulley into existent monitoring well installations, along with the reliability improvements associated with the instant design.

It is still another object of this invention to provide a lightning resistant hydrological pulley which is light-weight. Design features enabling the accomplishment of this object include a pulley body incorporating cutouts. Advantages associated with the realization of this object include lighter weight, and thus reduced inertia and increased responsiveness.

It is yet another object of the present invention to provide a lightning resistant hydrological pulley which uses conventional materials. Design features allowing this object to be accomplished include a pulley body made of metal, an insulator made of synthetic insulating material such as white Delrin or other appropriate material, and an axle insert made of metal. Benefits associated with the accomplishment of this object include reduced cost, and thus increased availability to the consumer.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIG. 3. Sheet four contains FIG. 4.

DETAILED DESCRIPTION OF THE PREFERRED EMBODIMENT

Figure 1:
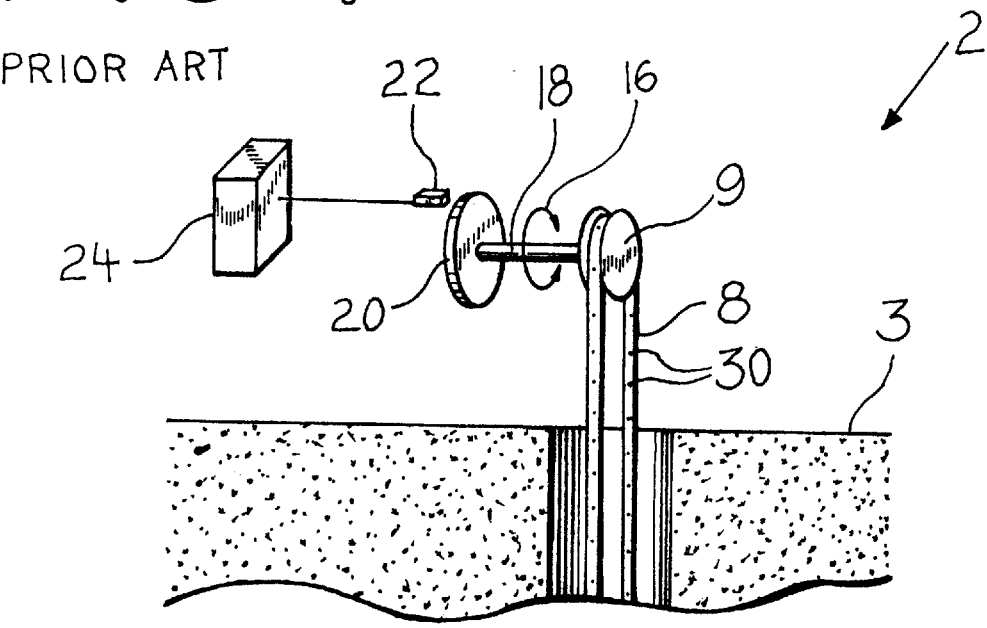
FIG. 1 is a front isometric view of a monitoring well installation.
Figure 1:
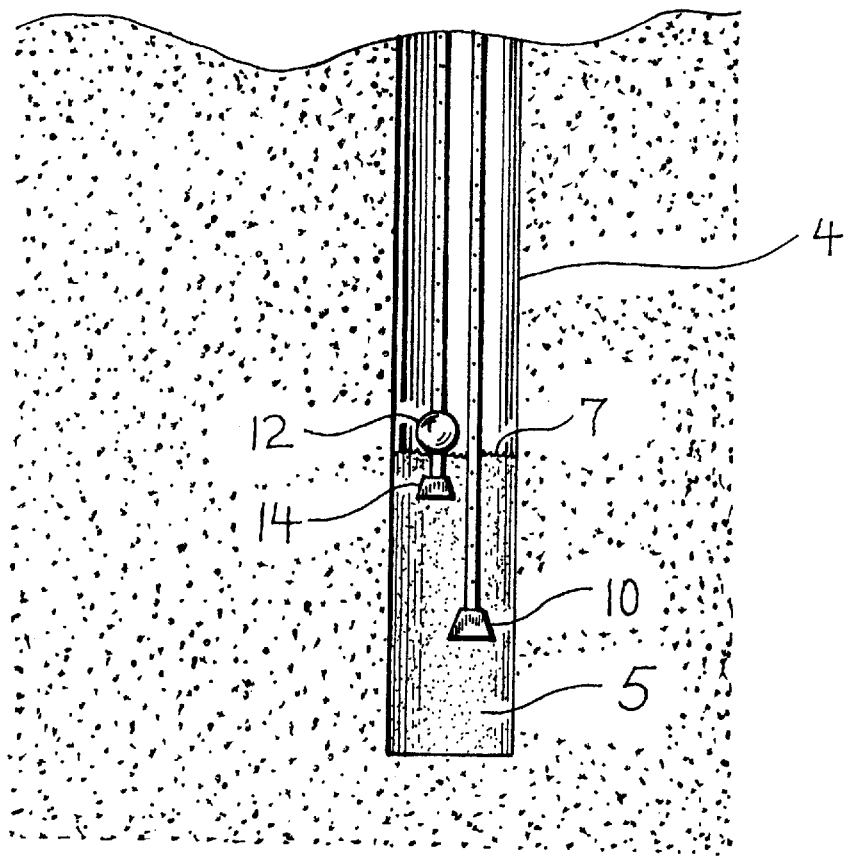
Figure 2:
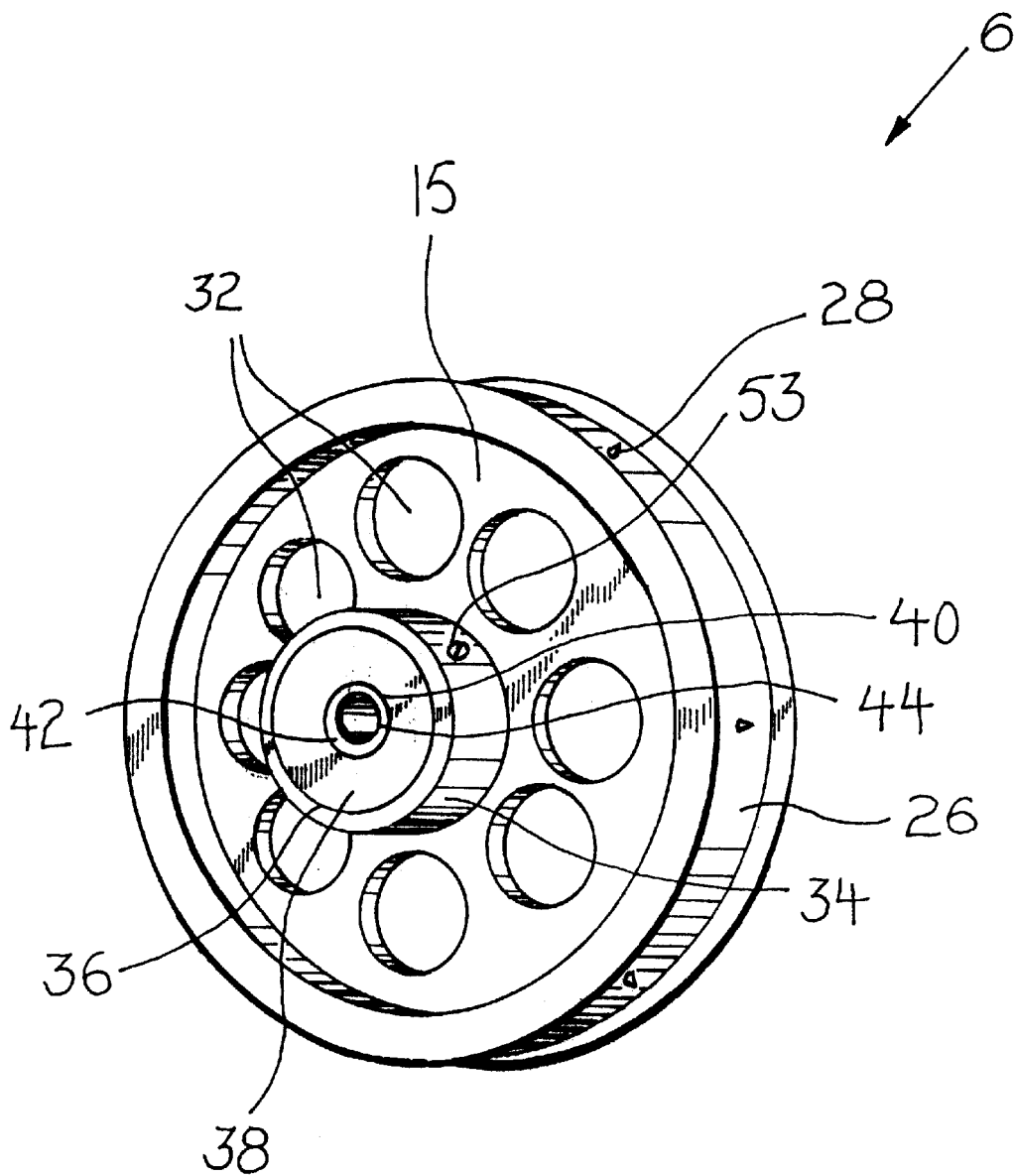
FIG. 2 is a front quarter isometric view of a lightning resistant hydrological pulley.

FIG. 2 is a front quarter isometric view of lightning resistant hydrological pulley 6. Lightning resistant hydrological pulley 6 comprises pulley body 15, insulator 38, and axle insert 42. Pulley body 15 comprises boss 34 having boss insulator bore 36. Insulator 38 is sized to fit into boss insulator bore 36. Insulator 38 comprises insulator axle insert bore 40, sized to admit axle insert 42. Axle insert 42 comprises axle insert bore 44, sized to admit axle 18 which attaches lightning resistant hydrological pulley 6 to encoder disk 20.

Figure 3:
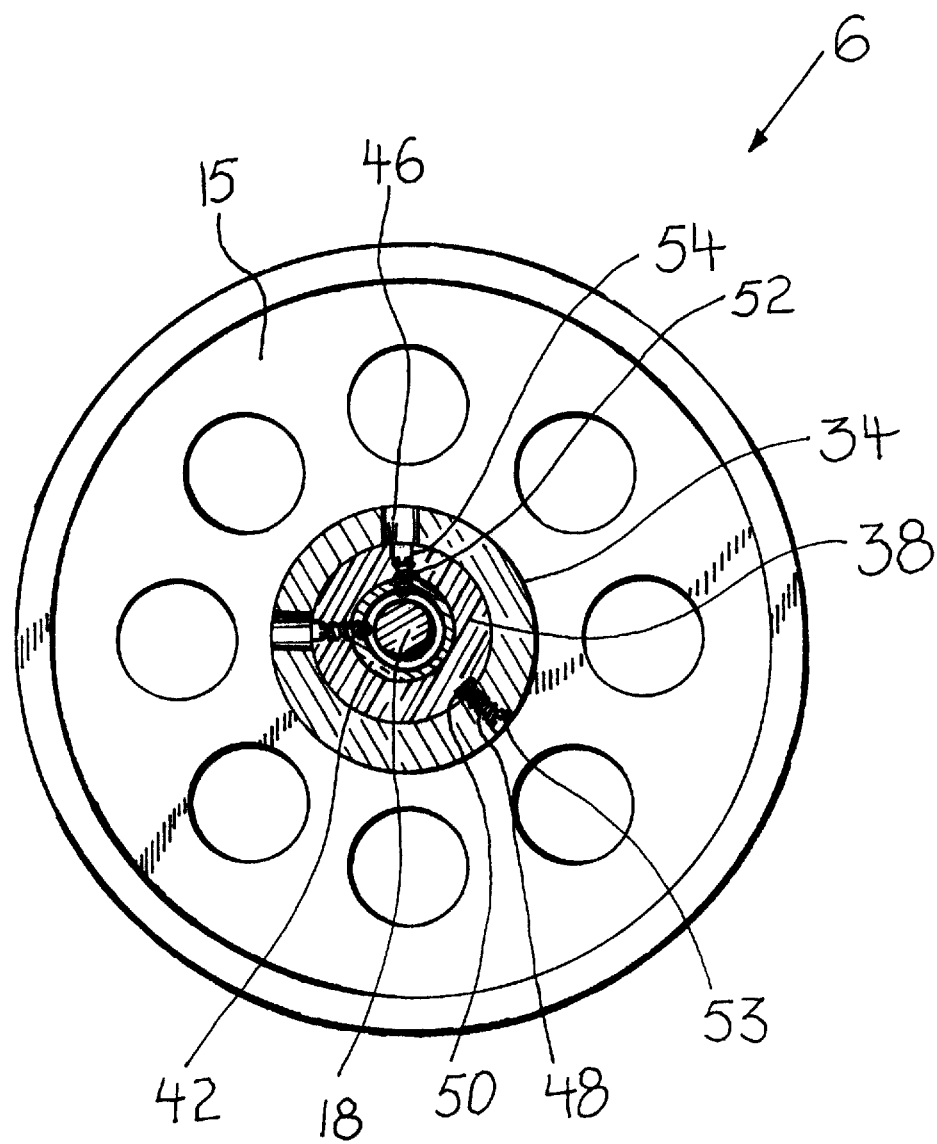
FIG. 3 is a front cross-sectional view of a lightning resistant hydrological pulley.
Figure 4:
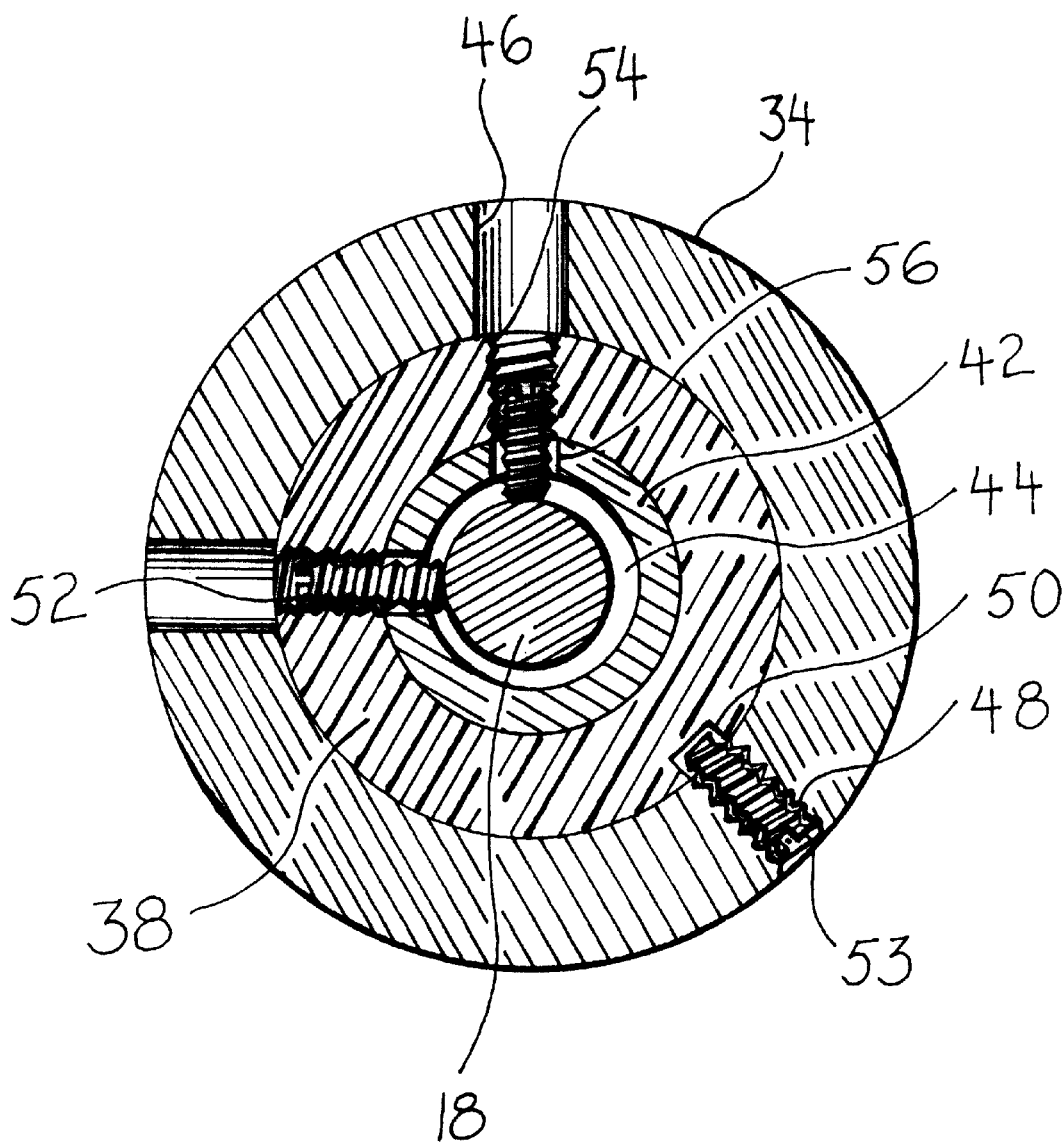
FIG. 4 is a front cross-sectional view of the boss area of a lightning resistant hydrological pulley.

FIG. 3 is a front cross-sectional view of lightning resistant hydrological pulley 6, and FIG. 4 is a front cross-sectional view of the boss 34 area of lightning resistant hydrological pulley 6. Referring now also to these figures, we observe that boss 34 further comprises radially disposed boss set screw bores 46, each sized to slidably admit an insulator set screw 52, and insulator 38 comprises radially disposed insulator threaded set screw bores 54, each sized to threadably mate with an insulator set screw 52. In addition, axle insert 42 comprises axle insert set screw bores 56, each sized to slidably admit an insulator set screw 52. The length of insulator set screw 52 is shorter than the radial width of insulator 38.

Thus, in order to angularly immobilize axle 18 relative to insulator 38, first each boss set screw bore 46 is lined up with a corresponding insulator threaded set screw bore 54 and an axle insert set screw bore 56. Then an insulator set screw 52 is inserted through each boss set screw bore 46, and threaded into the corresponding insulator threaded set screw bore 54, until the insulator set screw 52 extends into the corresponding axle insert set screw bore 56. Finally, each insulator set screw 52 is tightened onto axle 18 disposed within axle insert bore 44, thus angularly immobilizing axle 18 relative to insulator 38.

Boss 34 also comprises radially disposed boss threaded set screw bore 48 sized to mate with boss set screw 53, and insulator 38 comprises insulator recess 50, sized to admit boss set screw 53. Insulator 38 is angularly immobilized with respect to boss 34 by first aligning boss threaded set screw bore 48 with insulator recess 50, and then tightening boss set screw 53 into boss threaded set screw bore 48 and into insulator recess 50. In this fashion, when insulator set screws 52 and boss set screw 53 are tightened, lightning resistant hydrological pulley 6 is angularly immobilized on axle 18.

It is important to note that when lightning resistant hydrological pulley 6 is installed on axle 18 as explained above, and as is depicted in FIGS. 2–4, no electrical path exists from pulley body 15 to axle 18: insulator set screws 52 are buried within insulator threaded set screw bores 54 and are not in contact with boss 34, and boss set screw 53 dead-ends into insulator recess 50, which is a blind hole in electrically insulating material. Thus, when lightning resistant hydrological pulley 6 is mounted on axle 18, no electrical path exists from tape 8 and pulley body 15 to encoder 24, electronic sensor 22 or encoder disk 20, and in this fashion these components are insulated from lightning strikes to tape 8 or pulley body 15.

In the preferred embodiment, pulley body 15 and axle insert 42 were made of brass or other appropriate material, insulator 38 was made of white Delrin or other appropriate insulating material, and set screws 52, 53 were conventional, off-the-shelf fasteners. Pulley body 15 may comprise cutouts 32 to save weight and material, and to increase the responsiveness of lightning resistant hydrological pulley 6.

While a preferred embodiment of the invention has been illustrated herein, it is to be understood that changes and variations may be made by those skilled in the art without departing from the spirit of the appending claims.

DRAWING ITEM INDEX 2 monitoring well
3 ground level
4 well shaft
5 water
6 lightning resistant hydrological pulley
7 water level
8 tape
9 hydrological pulley
10 first weight
12 float
14 second weight
15 pulley body
16 arrow
18 axle
20 encoder disk
22 electronic sensor
24 encoder
26 tape groove
28 spike
30 spike hole
32 cutout
34 boss
36 boss insulator bore
38 insulator
40 insulator axle insert bore
42 axle insert
44 axle insert bore
46 boss set screw bore
48 boss threaded set screw bore
50 insulator recess
52 insulator set screw
53 boss set screw
54 insulator threaded set screw bore
56 axle insert set screw bore

I claim:

1. A lightning resistant hydrological pulley comprising a pulley body having a boss insulator bore, an insulator disposed within said boss insulator bore, said insulator comprising an insulator axle insert bore, an axle insert disposed within said insulator axle insert bore, said axle insert comprising an axle insert bore, means of angularly immobilizing said pulley body relative to said insulator, and means of angularly immobilizing said insulator relative to said axle insert and relative to an axle disposed within said axle insert bore.

2. The lightning resistant hydrological pulley of claim 1 wherein said means of angularly immobilizing said pulley body relative to said insulator comprises a boss on said pulley body, said boss insulator bore being disposed within said boss, a boss set screw, a boss threaded set screw bore through said boss, said boss threaded set screw bore being sized to mate with said boss set screw, and an insulator recess in said insulator, said insulator recess being sized to admit an extreme of said boss set screw, said boss set screw being tightened through said boss threaded set screw bore into said insulator recess.

3. The lightning resistant hydrological pulley of claim 1 wherein said means of angularly immobilizing said insulator relative to said axle insert and relative to said axle disposed within said axle insert bore comprises at least one insulator set screw, a boss set screw bore corresponding to each said at least one insulator set screw, an insulator threaded set screw bore corresponding to each said at least one insulator set screw, said corresponding insulator threaded set screw bore being sized to threadably mate with said at least one insulator set screw, and an axle insert set screw bore corresponding to each said at least one insulator set screw, said at least one insulator set screw being tightened within said corresponding insulator threaded set screw bore through said corresponding axle insert set screw bore onto said axle disposed within said axle insert bore.

4. The lightning resistant hydrological pulley of claim 3 wherein said pulley body further comprises a circumferential tape groove, and a plurality of spikes within said tape groove, said tape groove and said spikes being sized and spaced so as to mate with a conventional monitoring well tape.

5. The lightning resistant hydrological pulley of claim 4 wherein said pulley body further comprises a plurality of cutouts.

6. The lightning resistant hydrological pulley of claim 4 wherein said insulator is made of an electrically non-conductive material, and wherein said insulator set screws form no electrical path between said pulley body and said axle.

7. The lightning resistant hydrological pulley of claim 6 wherein said insulator is made of white Delrin.

8. The lightning resistant hydrological pulley of claim 7 wherein said pulley body and said axle insert are made of brass.

9. A lightning resistant hydrological pulley comprising a pulley body having a boss, said boss comprising a boss insulator bore, an insulator disposed within said boss insulator bore, said insulator comprising an insulator axle insert bore, an axle insert disposed within said insulator axle insert bore, and means of angularly immobilizing said insulator relative to said pulley body.

10. The lightning resistant hydrological pulley of claim 9, said means of angularly immobilizing said insulator relative to said pulley body comprising a boss set screw, a boss threaded set screw bore through said boss, said boss threaded set screw bore being sized to mate with said boss set screw, and an insulator recess in said insulator, said insulator recess being sized to admit an extreme of said boss set screw, said boss set screw being tightened through said boss threaded set screw bore into said insulator recess, whereby said pulley body is capable of being angularly immobilized relative to said insulator.

11. A lightning resistant hydrological pulley comprising a pulley body having a boss, said boss comprising a boss insulator bore, an insulator disposed within said boss insulator bore, said insulator comprising an insulator axle insert bore, and an axle insert disposed within said insulator axle insert bore, and means of angularly immobilizing said axle insert relative to said insulator.

12. The lightning resistant hydrological pulley of claim 11, said means of angularly immobilizing said axle insert relative to said insulator comprising at least one insulator set screw, a boss set screw bore corresponding to each said at least one insulator set screw, an insulator threaded set screw bore corresponding to each said at least one insulator set screw, said corresponding insulator threaded set screw bore being sized to threadably mate with said at least one insulator set screw, and an axle insert set screw bore corresponding to each said at least one insulator set screw, said at least one insulator set screw being tightened within said corresponding insulator threaded set screw bore through said corresponding axle insert set screw bore onto an axle disposed within an axle insert bore, whereby said insulator is capable of being angularly immobilized relative to said axle insert and relative to said axle disposed within said axle insert bore.

13. The lightning resistant hydrological pulley of claim 12 wherein said pulley body further comprises a circumferential tape groove, and a plurality of spikes within said tape groove, said tape groove and said spikes being sized and spaced so as to mate with a conventional monitoring well tape.

14. The lightning resistant hydrological pulley of claim 13 wherein said insulator is made of an electrically non-conductive material, and wherein said insulator set screws form no electrical path between said pulley body and said axle.

15. The lightning resistant hydrological pulley of claim 14 wherein said insulator is made of white Delrin.

16. The lightning resistant hydrological pulley of claim 15 wherein said pulley body and said axle insert are made of brass.

17. The lightning resistant hydrological pulley of claim 16 wherein said pulley body further comprises a plurality of cutouts.

* * * * *